US008935653B2

(12) United States Patent
Mazzoleni et al.

(10) Patent No.: US 8,935,653 B2
(45) Date of Patent: *Jan. 13, 2015

(54) SYSTEM ADVISOR FOR REQUIREMENTS GATHERING AND ANALYSIS IN WEB SOLUTIONS

(71) Applicant: International Business Machines Corporation, Armonk, NY (US)

(72) Inventors: Pietro Mazzoleni, Yorktown Heights, NY (US); Aubrey J. Rembert, Yorktown Heights, NY (US); Karthik Subbian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,105

(22) Filed: Aug. 22, 2013

(65) Prior Publication Data

US 2014/0214693 A1    Jul. 31, 2014

Related U.S. Application Data

(63) Continuation of application No. 13/754,043, filed on Jan. 30, 2013.

(51) Int. Cl.
*G06F 9/44* (2006.01)
*G06Q 10/10* (2012.01)

(52) U.S. Cl.
CPC .................................. *G06Q 10/101* (2013.01)
USPC ........................................................ 717/100

(58) Field of Classification Search
None
See application file for complete search history.

(56) References Cited

U.S. PATENT DOCUMENTS

| 7,299,202 | B2 | 11/2007 | Swanson |
| 7,444,315 | B2 | 10/2008 | Wu |
| 7,567,921 | B1 | 7/2009 | Ussery et al. |
| 7,587,367 | B2 | 9/2009 | Mengerink |
| 7,904,443 | B2 | 3/2011 | Neuneier et al. |
| 8,191,044 | B1 * | 5/2012 | Berlik et al. .................. 717/124 |
| 2002/0156799 | A1 * | 10/2002 | Markel et al. ................. 707/202 |
| 2008/0178147 | A1 * | 7/2008 | Meliksetian et al. ......... 717/107 |
| 2011/0041090 | A1 * | 2/2011 | Seolas et al. .................. 715/771 |
| 2011/0078557 | A1 * | 3/2011 | Seolas et al. .................. 715/234 |
| 2011/0184780 | A1 | 7/2011 | Alderson et al. |
| 2011/0225195 | A1 | 9/2011 | Kubicki et al. |
| 2012/0110544 | A1 * | 5/2012 | Novak et al. .................. 717/101 |

(Continued)

OTHER PUBLICATIONS

Credle, R. et al.; "WebSphere Commerce Best Practices in Web 2.0 Store"; IBM Corporation, http://ibm.com/redbooks/SG24-7647-00; Apr. 2009.

(Continued)

*Primary Examiner* — Philip Wang
(74) *Attorney, Agent, or Firm* — F. Chau & Associates, LLC

(57) ABSTRACT

A method for generating website feature requirements includes receiving a screen capture image including a website. The screen capture image is matched to one or more known website features listed within a database of website features. A website features requirements specification is generated based on the results of the matching. One or more recommendations for modifying the website features requirements specification is automatically generated based on considerations of cost or complexity of implementation. The website features requirements specification is updated based on the one or more recommendations.

10 Claims, 10 Drawing Sheets

(56) References Cited

U.S. PATENT DOCUMENTS

| | | | |
|---|---|---|---|
| 2012/0117152 A1 | 5/2012 | Falkenberg | |
| 2012/0123986 A1 | 5/2012 | Narendra et al. | |
| 2013/0174015 A1* | 7/2013 | Kwan | 715/234 |
| 2013/0218914 A1* | 8/2013 | Stavrianou et al. | 707/755 |

OTHER PUBLICATIONS

Credle, R. et al.; "WebSphere Commerce High Availability and Performance Solutions"; IBM Corporation, http://ibm.com/redbooks/SG24-7512-00; Aug. 2008.

Julian Terry, et al., "The Value of User Participation in F-Commerce Systems Development," Informing Science Journal, vol. 7, 2004, pp. 31-45.

Andreolini, N. et al.; "Impact of memory technology trends on performance of Web systems"; Interna'l Conference on Next Generation Web Services Practices, 7 pp.; IEEE Computer Society; 2006.

Anonymous; "Smart variable Web content solution—smart variable web content Interaction Server and smart variable web content framework—Smart Planet Initiatives"; http://priorartdatabase.com/IPCOM/000217423; May 7, 2012.

* cited by examiner

FIG. 8

SYSTEM ADVISOR FOR REQUIREMENTS GATHERING AND ANALYSIS IN WEB SOLUTIONS

CROSS-REFERENCE TO RELATED APPLICATIONS

This Application is a Continuation of co-pending U.S. patent application Ser. No. 13/754,043, filed on Jan. 30, 2013, the entire content of which is herein incorporated by reference.

TECHNICAL FIELD

The present disclosure relates to web solutions and, more specifically, to a system advisor for requirements gathering and analysis in web solutions.

DISCUSSION OF THE RELATED ART

Modern website design has become extraordinarily sophisticated. A wide range of solutions has emerged to help entities design a suitable web experience. In fact, the scope of available solutions is so vast that it may be difficult for many entities to determine which solutions they may be interested in utilizing in constructing their web experience. Accordingly, many entities enlist the support of consultants whose job it is to advise the entity as to the available solutions that may be of interest to the entity in construct their web experience.

Consultants, however, may not be able to offer clients a consistent advising experience as each consultant may have different opinions on the best available solutions to use. Moreover, every consultant may not possess a full understanding of all available solutions and trends, especially when it comes to new and emerging products.

Moreover, existing approaches for allowing consultants to share information and insight with clients and each other are rather limited as they may rely on consultants to communicate via email and telephone and these modes of communication may not adequately facilitate the systematic and complete transfer of knowledge.

SUMMARY

A method for generating website feature requirements includes receiving a screen capture image including a website. The screen capture image is matched to one or more known website features listed within a database of website features. A website features requirements specification is generated based on the results of the matching. One or more recommendations for modifying the website features requirements specification is automatically generated based on considerations of cost or complexity of implementation. The website features requirements specification is updated based on the one or more recommendations.

User-created annotations may be received with the screen capture image. The user-created annotations may identify and describe a feature of interest within the screen capture image. The user-created annotations may be used in performing the matching. The user-created annotations may reference a particular object within the screen capture image. The user-created annotations may include free text.

The matching may include comparing the screen capture image against a plurality of images associated with the one or more known website features and comparing the user-created annotations against a plurality of text descriptions associated with the one or more known website features.

The updated website features requirements specification may be stored in a database of website features requirements specifications and content of the database of website features requirements specifications may be used to generate statistical data, graphs, or other analytics. The statistical data, graphs, or other analytics may be used to interpret user preferences or trends in website features.

The method may additionally include providing the updated website features requirements specification to a user.

The user may be provided with an opportunity to modify the updated website features requirements specification.

A system for generating website feature requirements includes a requirements specification tool for generating a screen capture image of a website and a database of website features. A matching engine matches the screen capture image to one or more known website features listed within the database of website features. A requirements linkages advisor generates a website features requirements specification, based on the results of the matching, for automatically generating one or more recommendations for modifying the website features requirements specification based on considerations of cost or complexity of implementation, and for updating the website features requirements specification based on the one or more recommendations.

The requirements linkages advisor may receive indications of cost or complexity of implementation from an effort and complexity advisor.

The requirements linkages advisor may receive data pertaining to website features to add to the website features requirements specification from an alternatives solutions advisor.

The matching engine and the requirements linkages advisor may be part of a requirements gathering advisory system.

The requirements gathering advisory system may be connected to a project requirements repository where the updated website features requirements specification are stored.

The requirements gathering advisory system may be connected to a historical requirements knowledgebase that may include the database of website features as well as a database of documentation relating to the website features of the database of website features and a historical requirements knowledge database storing data pertaining to websites that have previously used the website features of the database of website features.

A cross-projects analytics module may perform analytics on the data pertaining to websites that have previously used the website features of the database of website features stored in the historical requirements knowledge database.

The requirements specification tool may be an application and may be executed by a computer system either directly or through a web browser.

The requirements specification tool may permit a user to create annotations that are used by the matching engine for matching the screen capture image to one or more known website features listed within the database of website features.

An intra-project analytics module may receive the updated website features requirements specification from a project requirements repository where they are stored and may perform analytics on the updated website features requirements specification.

A computer program product for generating website feature requirements includes a computer readable storage medium having program code embodied therewith. The program code is readable/executable by a computer processor for receiving a screen capture image including a website. User-created annotations identifying and describing a feature of interest within the screen capture image are received. The screen capture image is matched to one or more known website features listed within a database of website features. The user-created annotations are matched to the one or more known website features listed within the database of website features. A website features requirements specification is generated based on the results of the matching. One or more recommendations for modifying the website features requirements specification are automatically generated based on considerations of cost or complexity of implementation. The website features requirements specification is updated based on the one or more recommendations.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 8 is an illustration of an exemplary image with annotations in accordance with exemplary embodiments of the present invention;

DETAILED DESCRIPTION OF THE DRAWINGS

Figure 1:
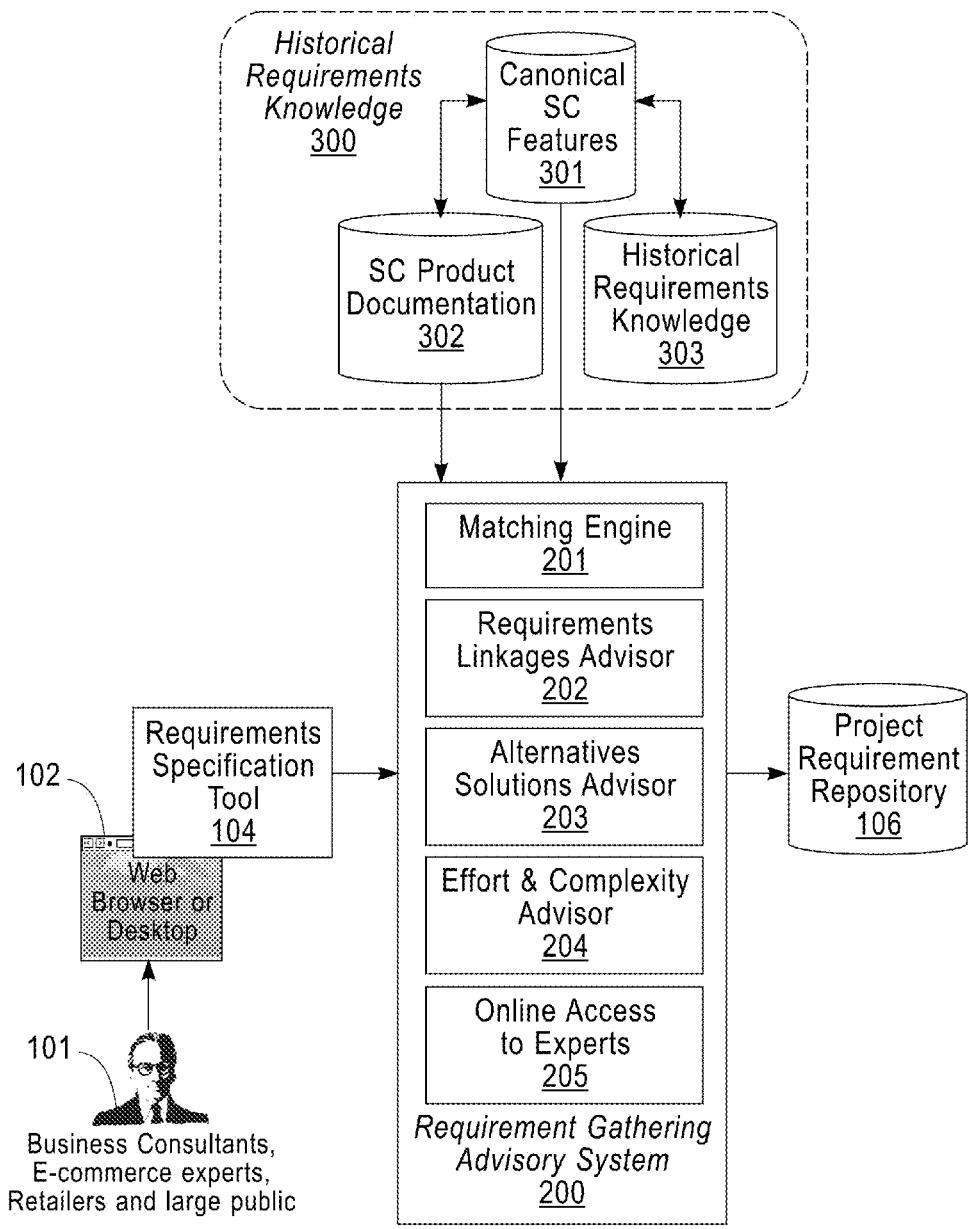
FIG. 1 is a diagrammatic flow chart illustrating an approach for providing automated requirements gathering and advice in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide approaches for the gathering and analysis of client requirements for building a web solution. This may be accomplished, for example, by establishing a system advisor tool that is capable of gathering knowledge about available web solutions, analyzing the requirements and preferences of a client and advising the client on available web solutions that may satisfy the client's requirements in a manner that is cost effective and competent. Moreover, the system advisor tool may also recommend changes to the client's requirements where it is determined that the needs of the client may be better suited by removing, adding or changing one or more requirements.

FIG. 1 is a diagrammatic flow chart illustrating an approach for providing automated requirements gathering and advice in accordance with exemplary embodiments of the present invention. A user 101 may either be a client wishing to build a web solution or a consultant and/or web developer working with such a client. The user may provide a set of requirements. The requirement may include one or more features that the user wishes to utilize within the web solution being constructed. Exemplary embodiments of the present invention may provide one or tools to assist the user 101 in providing the requirements. These tools may be conceptualized as requirements specification tools 104. Exemplary embodiments of the present invention may utilize a web browser or computer desktop 102 as a gateway for supplying the desired requirements. For example, one or more applications such as a browser plug-in may be installed on the client's 101 computer system so that the client 101, upon identifying a feature of interest within an existing website, may easily provide the system advisor tool with an example of the identified feature of interest.

Exemplary embodiments of the present invention may provide the user with at least four requirements specification tool resources. First, a particular ecommerce software feature may be provided. The user may select a particular ecommerce software feature by reviewing documentation that may be provided by the system advisor tool. Next, the user may select an inspirational website to use as a template in creating the new web solution. The system advisor tool may be provided with the URL of the inspirational website by the user or the system advisor tool may present to the user with an assortment of template websites and the user may be asked to select an inspirational site therefrom.

The user may also use like/dislike buttons placed within websites to communicate to the system advisor tool as to which features may be desired. In such a case, the websites may either be template websites provided by the system advisor tool or actual websites in which the system advisor tool stands between the user and the website and inserts the like/dislike buttons to identified features and monitors their use. For example, the system advisor tool may maintain a proxy and the user can browse the web via this proxy and in that way the system advisor tool may stand between the user and the website. Alternatively, the user may install a browser plug-in or access external websites through a website maintained by the system advisor tool.

In addition to using like/dislike buttons, one or more inline website feedback tools may be used by the user as requirements specification tools 104 to otherwise identify which website features constitute features the user would like to replicate for the web solution being constructed.

According to some exemplary embodiments of the present invention, the requirements specification tools include tools for permitting the user 101 to brows the web from the user's own web browser/desktop 102 and transmit screen capture images illustrating examples of desired features from the web browser/desktop 102 to the system advisor tool, and in particular, to a requirements gathering advisory system 200. The requirements gathering advisory system 200 may then utilize one or more knowledge repositories to correlate the received screen captures with available features and web solutions to advise upon comparable features, implementation complexity and efforts, impact on underline software products, feature trends, and to provide in-context access to solution experts.

In addition to providing requirements gathering, exemplary embodiments of the present invention may be used to facilitate fit-gap processes for ecommerce solutions whereby features and tools that were not specifically requested but would be required to provide features that were requested may be added to the user provided requirements. Moreover, exemplary embodiments of the present invention may be made available to the general public so that the system advisor tool may better gauge which web features are desired by the general public. These publically desired features may be referred to herein as "best of the web" features.

Advice may be provided by the system by referring to a canonical representation of possible features in an ecommerce solution. This canonical representation may include a listing of all available features in general or may be tailored to the available features for a particular industry or location.

Exemplary embodiments of the present invention may also be used to create feature-based analytics that may illustrate the popularity of one or more available ecommerce features. These analytics may be of particular interest to those engaged in developing new ecommerce features and solutions.

The requirements gathering advisor system 200 may access a knowledge repository during the course of its functioning. The knowledge repository may include a database of smarter commerce product documentation 302 for describing and defining the features of each available ecommerce product, a database of historical requirements knowledge 303 providing information as to features selected during past projects, and a database of canonical features 301. Together these databases may make comprise historical requirements knowledge.

A requirements linkage advisor 202 may link the user supplied requirements from the requirements specification tool 104 with the available features and web solutions from the database of canonical features 301. For example, the requirements linkage advisor 202 may receive a screen capture image showing a feature in action and link that image to an available feature within the database of canonical features 301, for example, by performing image comparison analysis. These comparisons may be made, for example, with the assistance of one or more matching engines 201 that can efficiently match images and descriptions of existing features with the set of features from the canonical features database 301.

However, the features and solutions identified by the user need not constitute the final set of requirements. The requirements gathering advisor system 200 may utilize an alternative solution advisor 203 to make recommendations as to other possible features and solutions may be used in addition to those supplied or in place of one or more of those supplied. The alternative solution advisor 203 may also identify features and solutions that may be unneeded or simply not justified by the scope of the project. In making these determinations, the alternative solution advisor 203 may utilize output from an effort and complexity advisor 204 which may rate the effort, complexity, and cost of each of the features and solutions either selected by the user or considered by the alternative solutions advisor 203 so that the alternative solutions provided may be based upon maximizing efficiency and economy.

The requirements gathering advisor system 200 may also include a line of communication to provide online access to one or more experts 205 so that where desired, one or more human experts may review the set of requirements and provide their own suggested changes, additions, and/or deletions of the set of requirements.

Once the set of requirements has been finalized, these requirements may be stored in a project requirements repository 106.

Figure 2:
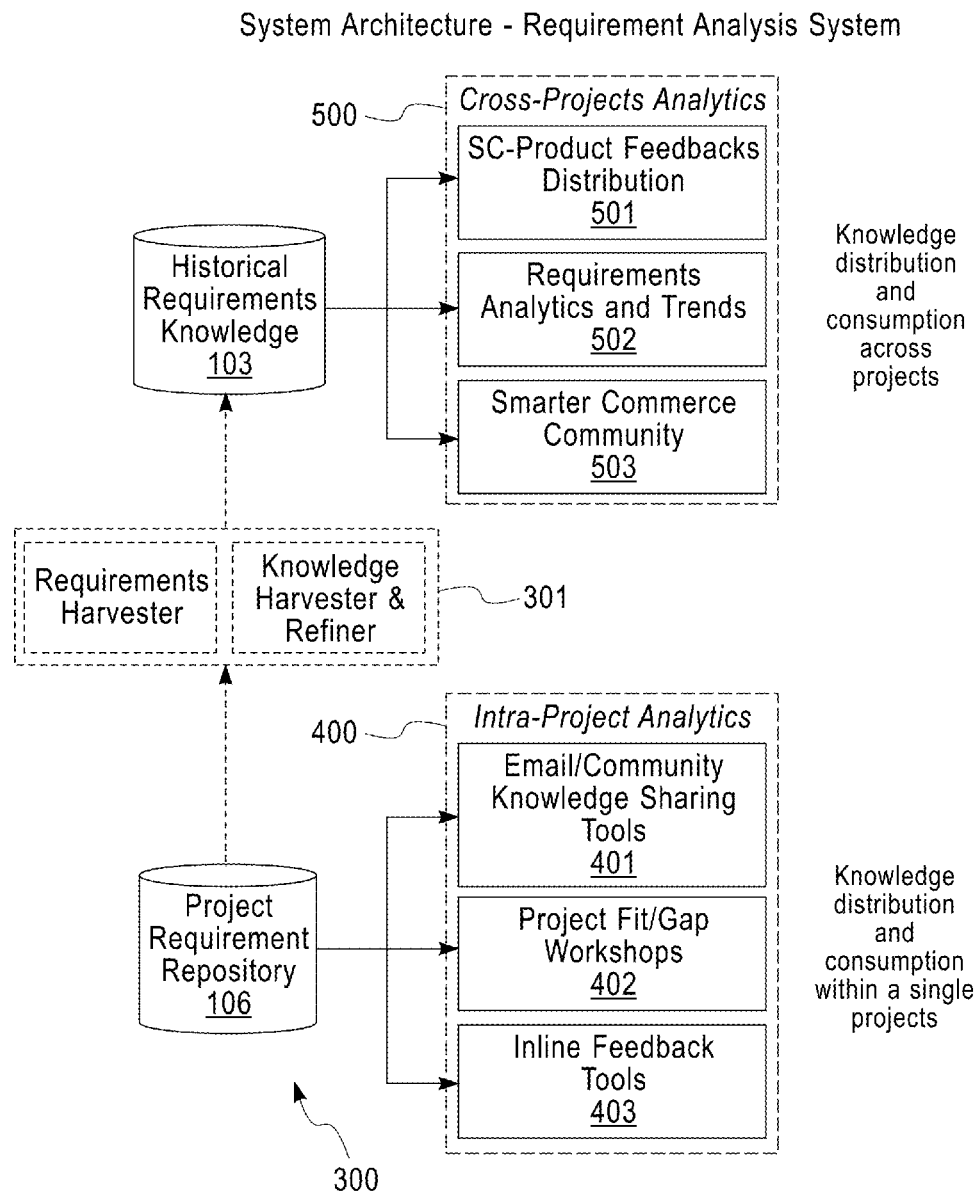
FIG. 2 is a diagram illustrating system architecture for requirement analysis in accordance with exemplary embodiments of the present invention.

FIG. 2 is a diagram illustrating system architecture for requirement analysis in accordance with exemplary embodiments of the present invention. The system architecture 300 may include the project requirements repository 106 which stores the final set of requirements for the various projects. This requirements data may them be sent to an intra-project analytics module 400 for perming desired analytics on the final requirements. The intra-project analytics module 400 may include email/community knowledge sharing tools 401 for communicating the produced analytics and/or requirements to various interested parties. One or more project fit/gap workshop modules 402 may use the analytics and/or requirements to enhance the skills or capabilities of people or systems performing fit/gap analysis. The analytics and/or requirements may also be used by inline feedback tool modules 403 to improve the capabilities of the inline feedback systems. In this way, project knowledge pertaining to a particular project may be automatically and effectively communicated for consumption.

The requirements data may also be sent form the project requirements repository 106 to the historical requirements knowledge database 103 to add to the historical requirements data stored therein. In so doing, the desired data may first be extracted from the requirements data using a data extractor 105. The data extractor 105 may include a requirements harvester 107 and/or knowledge harvester and refiner 108.

The historical requirements knowledge database 103 may provide the historical requirements data to a cross-projects analysis module 500. The cross-projects analysis module 500 may include a product feedback distribution component 501 for providing desired project feedback to interested parties, a requirements analytics and trends component 502 for reporting on trends, and a smarter commerce community component 503 for providing data of interest to a development community at large. In this way, project knowledge related to multiple projects may be distributed for consumption.

Figure 3:
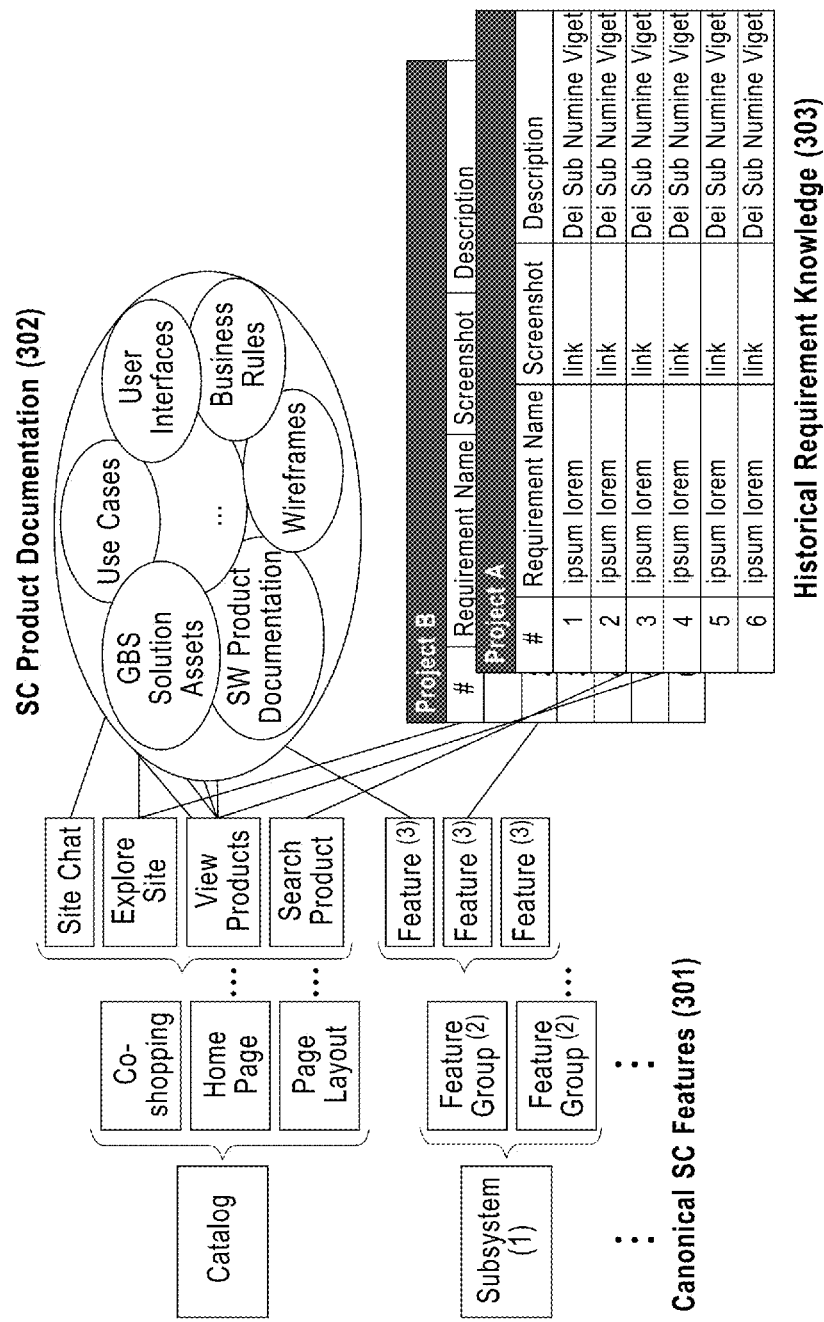
FIG. 3 is a diagram illustrating a composition of data models used to store canonical features, historical requirements knowledge, and product documentation in accordance with exemplary embodiments of the present invention.

FIG. 3 is a diagram illustrating a composition of data models used to store canonical features, historical requirements knowledge, and product documentation in accordance with exemplary embodiments of the present invention. The database of canonical features 301 may include a catalog and a set of one or more subsystems. The catalog may hierarchically represent each available feature therein by categories and as many levels of subcategories as are desired. The database of product documentation 302 may include the available documentation for each feature from the database of canonical features 301 and the catalog may be indexed to the product documentation 302 such that each cataloged entry is associated with its corresponding documentation. Similarly, the catalog may be indexed to the historical requirements knowledge database 303 such that each cataloged entry is associated with the historical requirements that used it.

The subsystems of the canonical features 301 may store pertinent information for each feature and this information may similarly be indexed to the product documentation 302 and the historical requirements. The canonical features may be organized within the database 301 in hierarchical groups according to such features as the business process or usage scenario in which they belong, the application on a given industry, and/or based on the software modules in which they are usually found, for example, analytics.

Within the product documentation database 302, the documentation may be organized by each feature. Each feature may be illustrated with a title, description, set of metadata, and/or links to documentation. Documentation may include software product documentation such as user manuals, samples, etc., design documents, and/or market reports. The metadata may include the name and version of the product in which the feature may be found, a list of web solutions or customers that use the features, and/or a list of people who have extensive experience customizing the feature.

The historical requirements knowledge database 303 may include previously used requirements. The requirements may be linked to the canonical features. Each requirement may be stored in the historical requirements knowledge database 303 along with title and description, metadata including complexity, priority, owner, scope (i.e. global, local, etc.), links to existing web solutions using the feature, and/or dependencies to other requirements.

Figure 4:
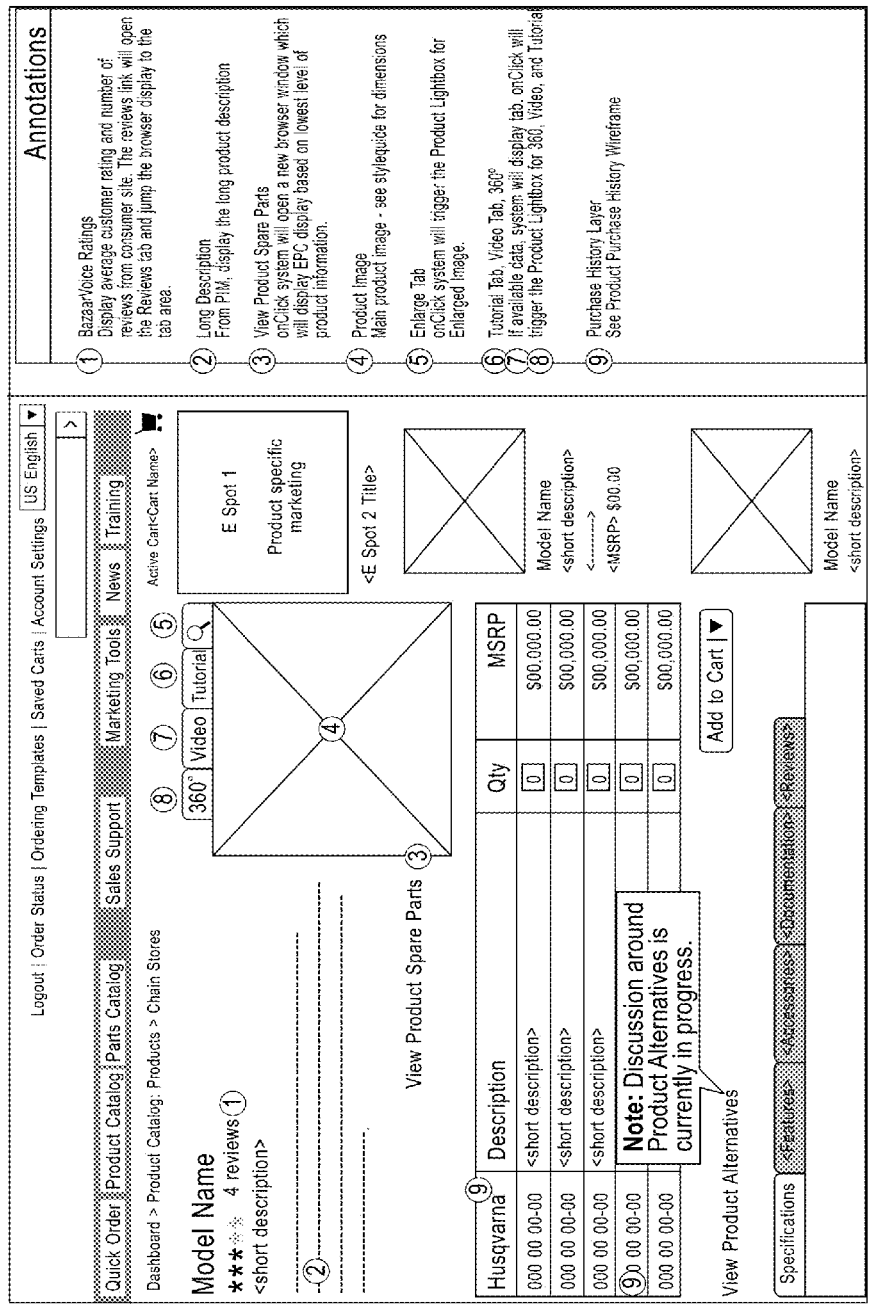
FIG. 4 is an example of an annotated image to be stored in the historical requirements knowledge database in accordance with exemplary embodiments of the present invention.

Requirements may also be stored within the historical requirements knowledge database 303 as annotated images, for example, as generated using the requirements specification tool 104 discussed above. FIG. 4 is an example of an annotated image to be stored in the historical requirements knowledge database in accordance with exemplary embodiments of the present invention. Here, each requirement may have a title, a description, a set of metadata (e.g. matching feature) and a link to an image or a part of an image. The link may be a link to an image stored locally or it may be a URL pointing to an image available on the Internet.

Annotation of the image may include a number or symbol placed in proximity to a desired feature as shown on the image and an annotation key that describes the feature that is being pointed out.

Figure 5:
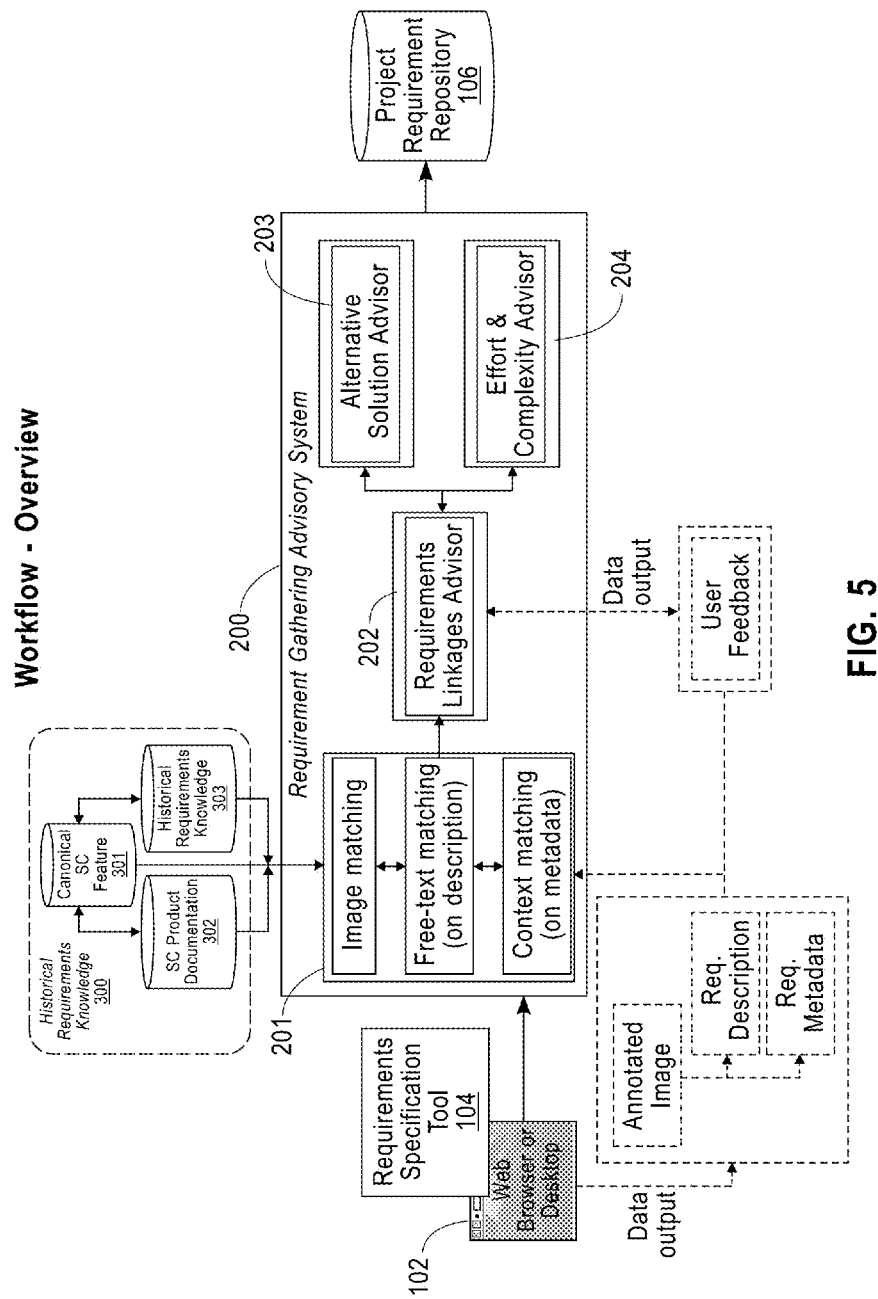
FIG. 5 is a schematic diagram illustrating a workflow for performing requirements gathering and analysis in accordance with exemplary embodiments of the present invention.

FIG. 5 is a schematic diagram illustrating a workflow for performing requirements gathering and analysis in accordance with exemplary embodiments of the present invention. The user may access a requirements specification tool 104 using a web browser or desktop application 102. The requirements may be identified by the used by capturing a screen image and annotating the image. This data may then be provided to a requirement gathering advisor system 200 where matching engines 201 may perform image matching on the screen image, free-text matching on a description of the features found within the screen image, either created by annotation or as part of the screen image, and/or context matching on the feature metadata. Different matching techniques may be combined in matching the requirements identified by the user to actual known features as the repository 300 may contain different types of information.

The matching may be conducted with reference to the historical requirements knowledge 300, and in particular, the canonical features database 301, the product documentation database 302, and the historical requirements knowledge database 303. All knowledge in the repository 300 may be used for matching. The matching engines 201 may provide their matching results to a requirements linkages advisor 202, which may draw information from an alternative solution advisor 203 and an effort and complexity advisor 204 to determine which requirements may be added, removed and/or changed.

The requirements linkages advisor 202 may rank available features based on their relevance, which may be computed in accordance with various techniques, to what is defined by the user. Once the user selects one or more matching requirements, the repository may be searched again and alternative solutions and efforts may be retrieved. The effort and complexity advisor 204 may estimate effort and complexity based on the information of similar solutions found within the repository.

The final requirements may be output to the project requirements repository 106, as described above.

Additionally, user feedback may be considered by the requirements linkages advisor 202. This user feedback may either be provided by the same user who created the first set of requirements or by an independent expert, who may receive the annotated images including the requirements description and the requirements metadata. For example, the same user may refine their information and re-run the matching at any point. These annotations may be sent separately from the image itself.

Figure 6:
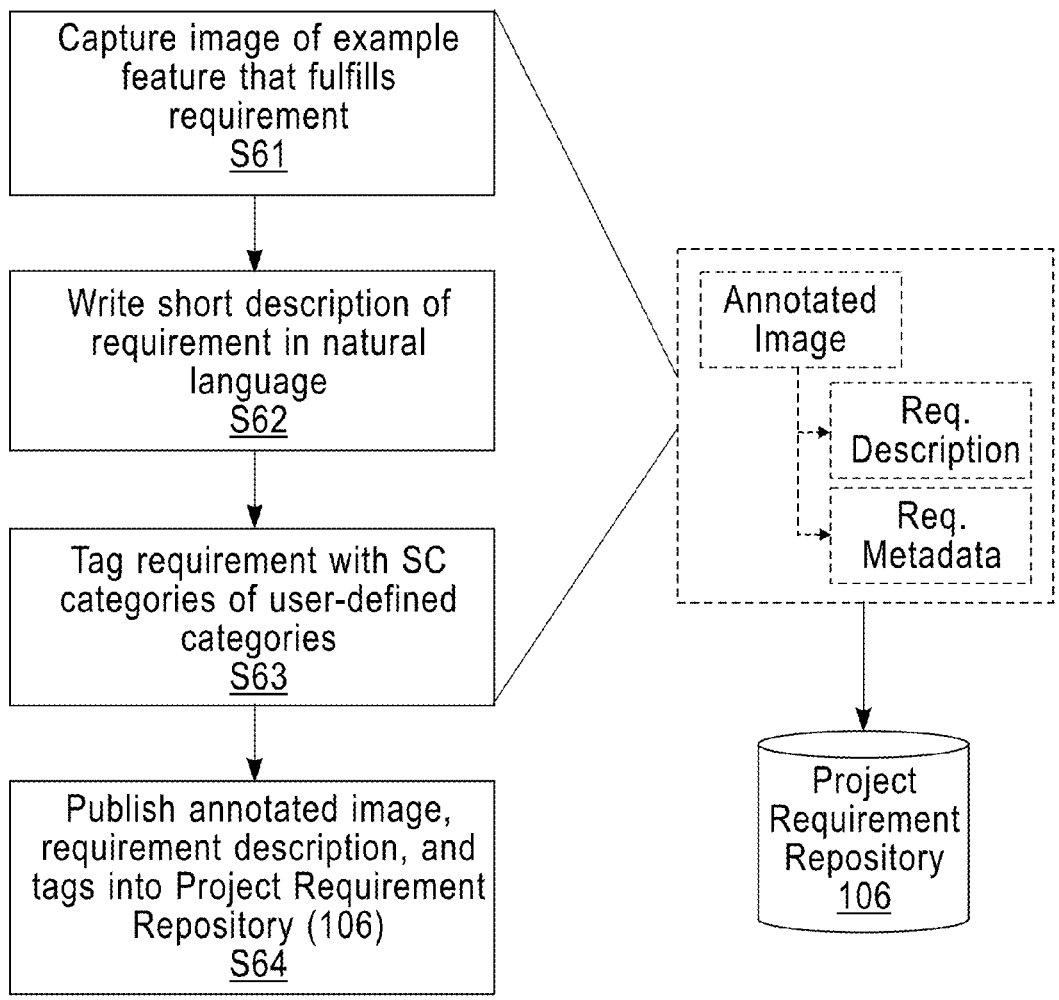
FIG. 6 is a flow chart illustrating a workflow of a requirements specification tool in accordance with exemplary embodiments of the present invention.

FIG. 6 is a flow chart illustrating a workflow of a requirements specification tool 104 in accordance with exemplary embodiments of the present invention. First, the user may use a tool to capture an image of an example feature that fulfills a requirement (Step S61). Many tools exist to enable image capture of a screen or window and thus any number of tools may be used to fulfill this purpose. Next, the user may write a short description of the desired requirement, for example, in natural language (Step S62). The precise feature responsible for satisfying the requirement may be identified, for example, tagged, within the image. Tags may include a feature category. By capturing the image, writing the description, and tagging the image, the annotated image requirements representation may be created. Thereafter the annotated image, including requirements description and requirements metadata, may be published into the project requirements repository 106.

Figure 7:
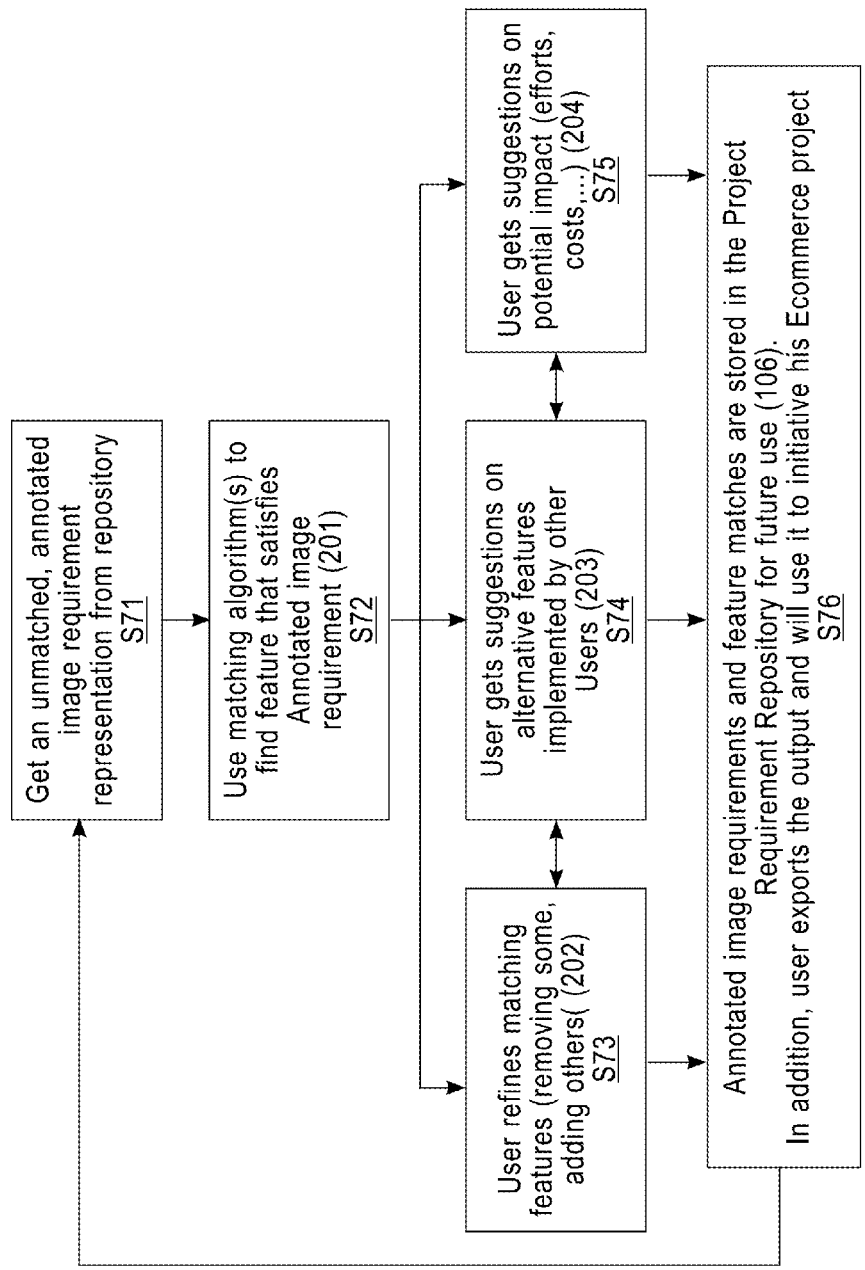
FIG. 7 is a flow chart illustrating a workflow for performing requirements linkage in accordance with exemplary embodiments of the present invention.

FIG. 7 is a flow chart illustrating a workflow for performing requirements linkage in accordance with exemplary embodiments of the present invention. First the unmatched, annotated image that represents the requirement is obtained (Step S71). One or more matching algorithms may then be used to identify features that satisfy the annotated image requirement (Step S72). From there, a user may refine the matching (Step S73), for example, by adding and/or removing features, the user may receive suggestions on alternative features implemented by other users (Step S74), and/or the user may receive suggestions on potential impact of adopting various features (Step S75). This may include estimates on cost and/or complexity. Cost may include, not only monetary costs, but costs associated with the use of limited resources as well.

Thereafter, the annotated image requirements and feature matches may be stored in the project requirements repository for future use (Step S76). Additionally, the user may export the final set of requirements for use in developing an ecommerce project.

Figure 8:
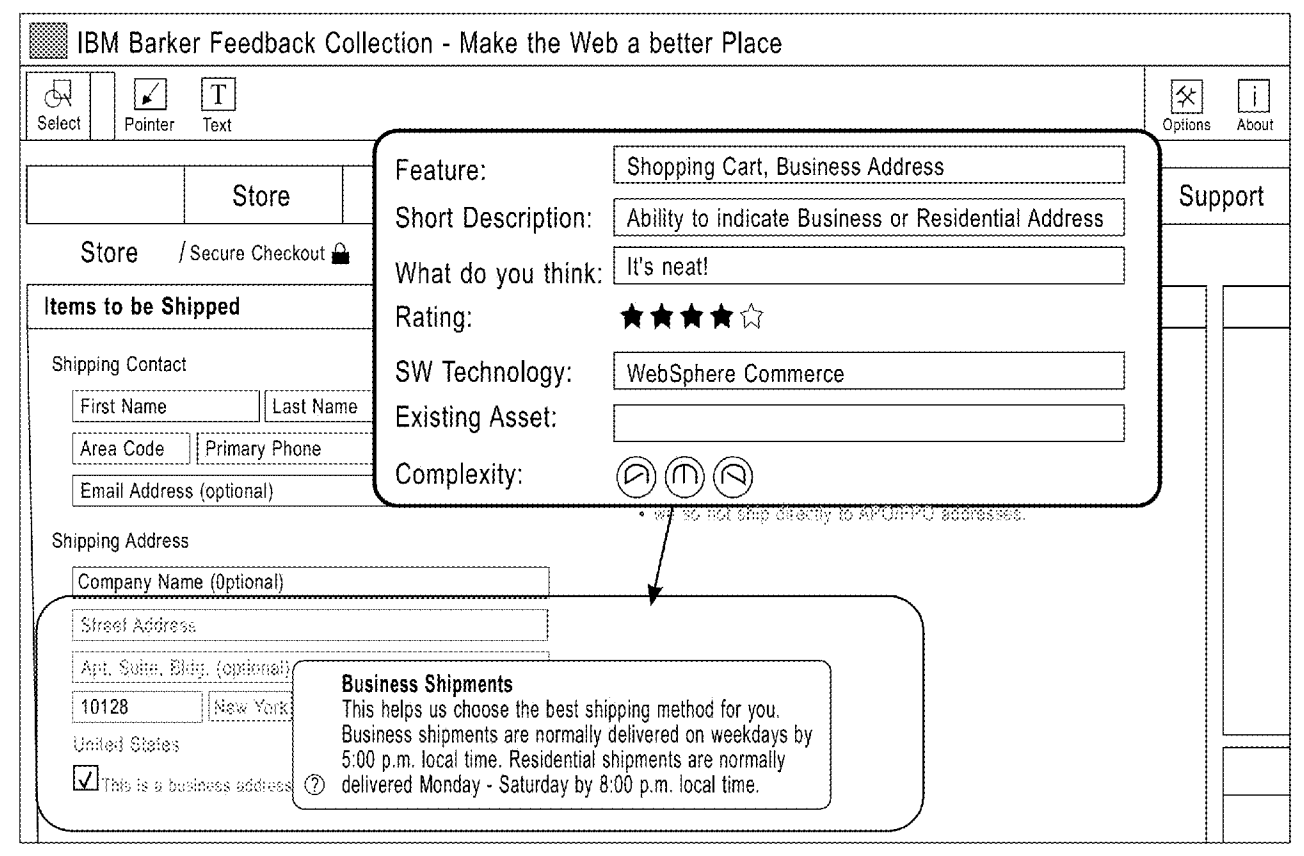

Exemplary embodiments of the present invention may include either an entire system for the automated generation of web solutions or may be limited to automatically suggesting changes to user-selected requirements. Alternatively, exemplary embodiments of the present invention may be limited to the receiving of annotated user images and matching the images to known features. Accordingly, the annotation of images is worthy of additional disclosure. FIG. 8 is an illustration of an exemplary image with annotations in accordance with exemplary embodiments of the present invention. Here an image of a website is illustrated. The user draws an identifier box over the section of interest that exhibits the feature. Then, a dialog box may appear providing the user with the opportunity to annotate the section of the figure. The dialog box may prompt the user to enter such data as feature name, short description, a statement of opinion, a quantitative rating, a feature category, an existing asset that the feature may be used with, and a level of complexity. The image may be transmitted as a picture file, such as a JPEG or the like while the annotations may be transmitted as text.

Once submitted and stored, the annotated images may be queried as needed. This may permit an interested party to review and analyze what peoples opinions are concerning various website features and to determine statistics associated with user opinion. This may be particularly useful where the system is made available to the general public to gather opinions on best of the web features as discussed above.

Figure 9:
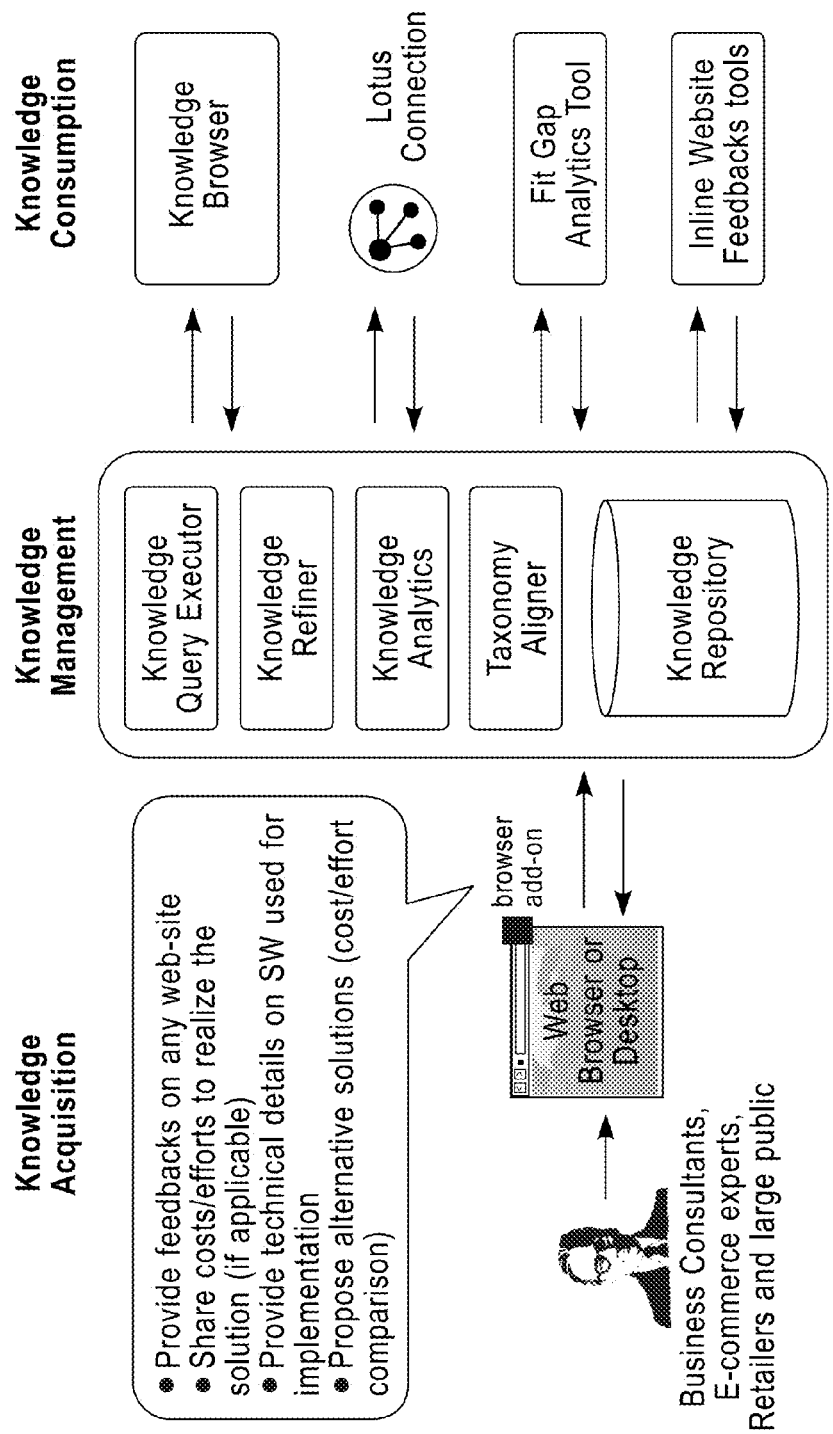
FIG. 9 is a diagram illustrating an approach to web feature rating and sharing in accordance with exemplary embodiments of the present invention.

FIG. 9 is a diagram illustrating an approach to web feature rating and sharing in accordance with exemplary embodiments of the present invention. Using this approach, a community of users in which inspiring ecommerce features are discovered may be formed. Then, discovered features may be shared and compared so that clients may be guided in understanding available features.

Such an approach may include three components. The first component is knowledge acquisition. Here feedback may be provided on any web site features encountered. Where applicable, the costs and effort associated with implementing the various features may be shared. Technical details on the software used to affect implementation may be provided. Alternative approaches to achieving similar functionality may also be shared and compared based on factors such as cost and effort. In performing knowledge acquisition, the above-described approaches for capturing and annotating web sites may be used.

The second component may be knowledge management. The knowledge acquired may be stored in a knowledge repository and various components may utilize the stored knowledge. These components may include a knowledge query executor for using the knowledge repository to answer interesting questions about various web presence features. A knowledge refiner may be used to process the available information into other more useful forms. For example, knowledge about how particular features are perceived by the general public may be used by the knowledge refiner to determine a set of most popular features and trending features. A knowledge analytics engine may be used to calculate pertinent statistics about adoption and opinion of various features and to display these statistics in a meaningful graphical representation. A taxonomy aligner may be used to characterize and group the known features according to various considerations such as function, popularity, cost and complexity, etc.

The third component may be knowledge consumption. Here the processed information may be practically applied. For example, a knowledge browser may be used to interface with the knowledge query executor so a user can run a desired query and benefit from the desired information. The knowledge browser may also be used to draw upon the refined information, the analytics and the taxonomy. This information may also be accessed by various social software applications such as LOTUS CONNECTIONS developed by IBM. This information may also be accessed by various fit/gap analysis tools that attempt to determine whether particular features are effectively satisfying the requirements they were designed to satisfy. Various inline website feedback tools may also draw upon this information to determine whether a particular website is utilized as intended.

Figure 10:
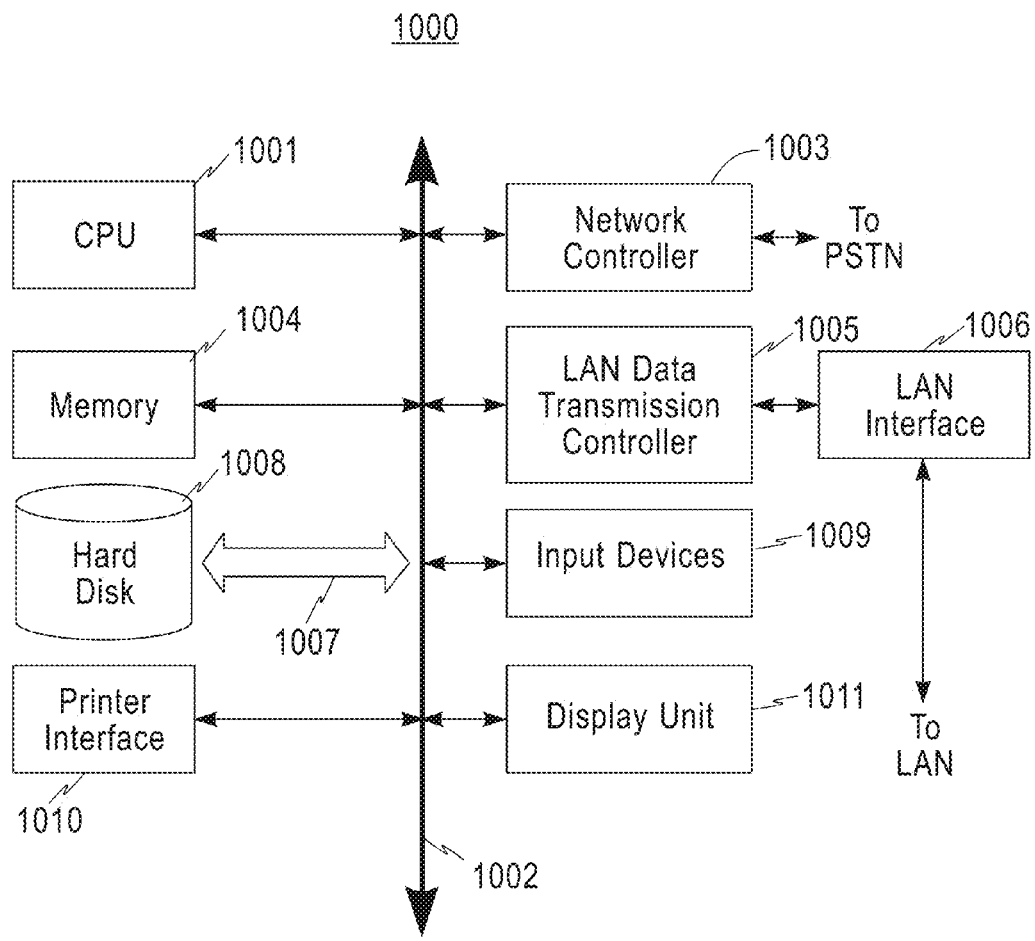
FIG. 10 shows an example of a computer system capable of implementing the method and apparatus according to embodiments of the present disclosure.

FIG. 10 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims

What is claimed is:

1. A system for generating website feature requirements, comprising:
   a requirements specification tool for generating a screen capture image of a website;
   a database of website features;
   a matching engine for matching the screen capture image to one or more known website features listed within the database of website features; and
   a requirements linkages advisor for generating a website features requirements specification based on the results of the matching, for automatically generating one or more recommendations for modifying the website features requirements specification based on considerations of cost or complexity of implementation, and for updating the website features requirements specification based on the one or more recommendations,
   wherein the requirements specification tool, the database of website features, the matching engine, and the requirements linkages advisor include one or more computer systems.

2. The system of claim 1, wherein the requirements linkages advisor receives indications of cost or complexity of implementation from an effort and complexity advisor.

3. The system of claim 1, wherein the requirements linkages advisor receives data pertaining to website features to add to the website features requirements specification from an alternatives solutions advisor.

4. The system of claim 1, wherein the matching engine and the requirements linkages advisor are part of a requirements gathering advisory system.

5. The system of claim 4, wherein the requirements gathering advisory system is connected to a project requirements repository where the updated website features requirements specification are stored.

6. The system of claim 4, wherein the requirements gathering advisory system is connected to a historical requirements knowledgebase that includes the database of website features as well as a database of documentation relating to the website features of the database of website features and a historical requirements knowledge database storing data pertaining to websites that have previously used the website features of the database of website features.

7. The system of claim 6, further including a cross-projects analytics module for performing analytics on the data pertaining to websites that have previously used the website features of the database of website features stored in the historical requirements knowledge database.

8. The system of claim 1, wherein the requirements specification tool is an application and is executed by a computer system either directly or through a web browser.

9. The system of claim 1, wherein the requirements specification tool permits a user to create annotations that are used by the matching engine for matching the screen capture image to one or more known website features listed within the database of website features.

10. The system of claim 1, further including an intra-project analytics module for receiving the updated website features requirements specification from a project requirements repository where they are stored and performing analytics on the updated website features requirements specification.

* * * * *